United States Patent [19]

Ono et al.

[11] Patent Number: 5,267,083
[45] Date of Patent: Nov. 30, 1993

[54] LENS SYSTEM FOR OPTICAL READER

[75] Inventors: Yuzo Ono; Hiroyuki Miyazaki, both of Tokyo, Japan

[73] Assignee: NEC Corporation, Tokyo, Japan

[21] Appl. No.: 858,613

[22] Filed: Mar. 27, 1992

[30] Foreign Application Priority Data

Mar. 27, 1991 [JP] Japan .......................... 3-85896
May 13, 1991 [JP] Japan .......................... 3-135308

[51] Int. Cl.$^5$ .......................................... G02B 15/14
[52] U.S. Cl. ...................................... 359/689; 359/682
[58] Field of Search .................... 359/683, 689, 682

[56] References Cited

U.S. PATENT DOCUMENTS 4,526,443 7/1985 Hirose ................................ 359/683
4,757,336 7/1988 Nakayama et al. ................ 359/689
4,854,683 8/1989 Ozawa ................................ 359/689

*Primary Examiner*—Scott J. Sugarman
*Attorney, Agent, or Firm*—Sughrue, Mion, Zinn, Macpeak & Seas

[57] ABSTRACT

First to third lenses are arranged in order to have a common optical axis. The first and second lenses provide a combined lens structure for shifting an object point along the common optical axis by moving one of the first and second lenses along the common optical axis, while an image point is formed in accordance with the shifted object point by the third lens. A spot diameter is kept constant at the image point by shifting the object point.

4 Claims, 3 Drawing Sheets

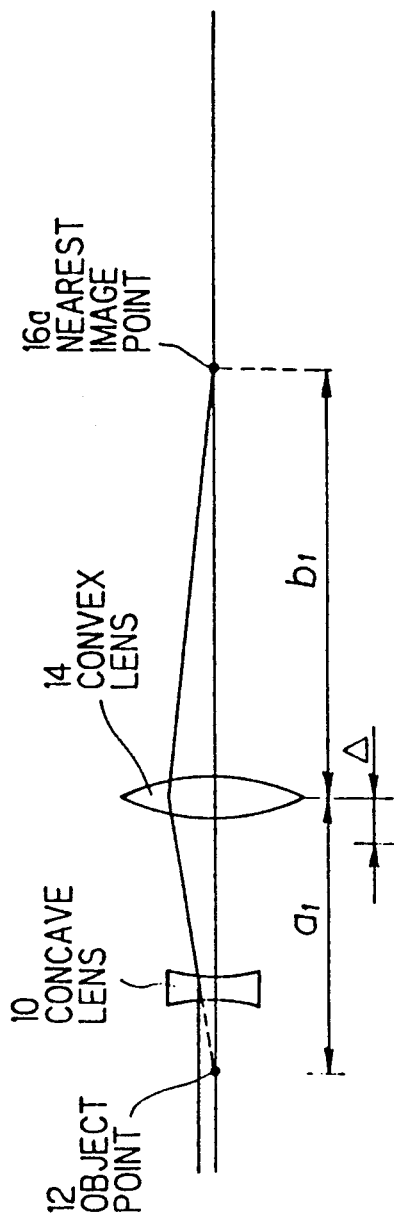
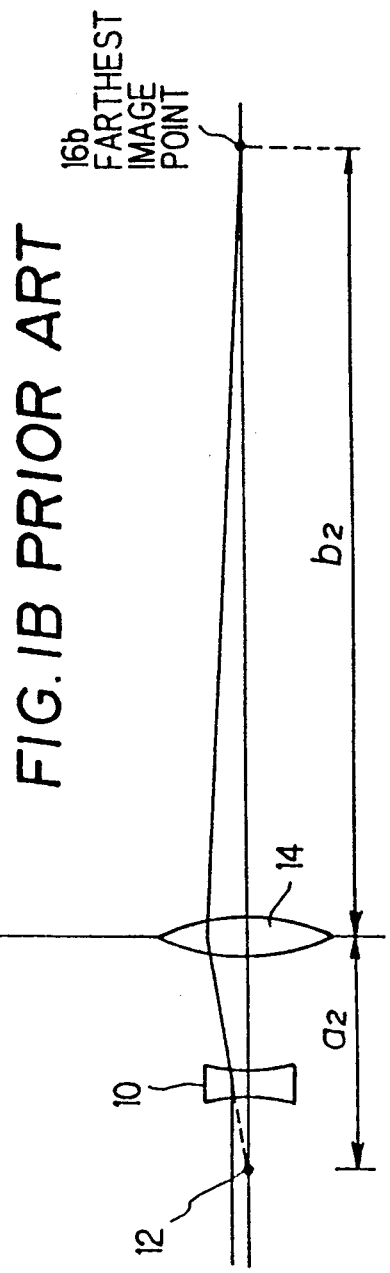

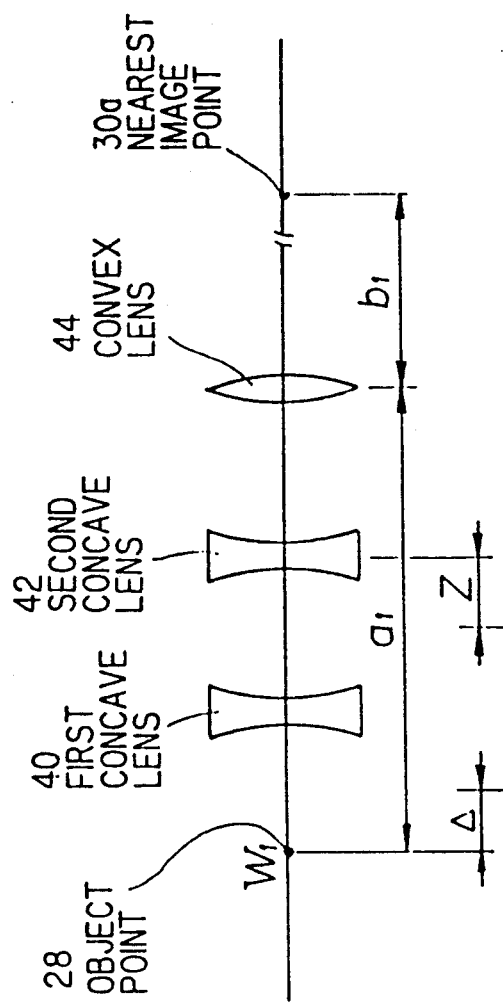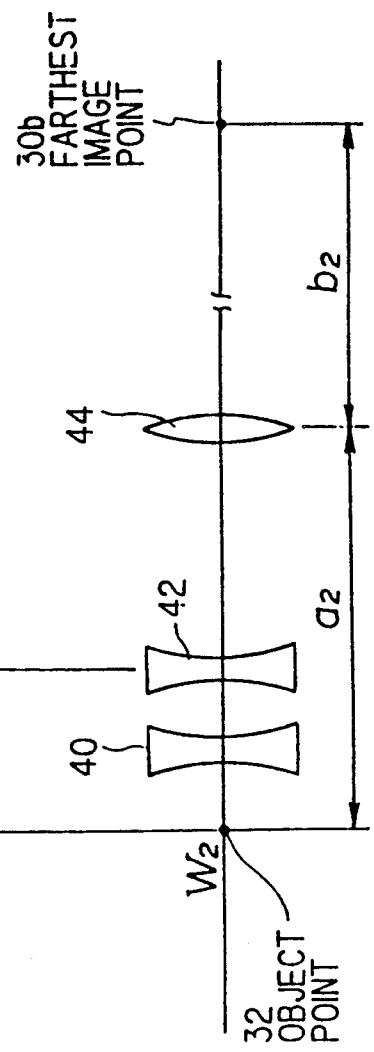

LENS SYSTEM FOR OPTICAL READER

FIELD OF THE INVENTION

This invention relates to a lens system for an optical reader, and more particularly to a lens system for a bar code reader in which the focal point is variable.

BACKGROUND OF THE INVENTION

One conventional bar code reader is described in the report "BAR CODE READER" on pages 120 to 124 in a journal "O plus E" published June, 1990 by Hiroyuki Miyazaki. In this journal, the bar code reader includes a lens system for supplying a laser beam to a bar code. The lens system includes a first lens fixed on the side of an object point and a second lens which is slidable along an optical axis on the side of an image point. The second lens slides with a predetermined stroke to shift a focal point in accordance with a distance to the bar code, so that a depth of reading the bar code can be expanded.

In the lens system, when the laser beam is directed onto the bar code, a reflection light modulated by black and white stripes of the bar code is detected, so that the bar code is read.

According to the conventional lens system, a shift amount of the image point is equal to a product between a moving amount of the object point on the second lens and a longitudinal magnification of the lens system, when the object point or the second lens is moved in an optical axial direction. The longitudinal magnification is equal to the square of a transversal magnification of the lens system, which is an imaging magnification, so that the image point is greatly shifted by moving either the object point or the second lens along an optical axis even to a small extent, when the imaging magnification is set to be large.

However, the conventional lens system has disadvantages in that steps for adjusting a focal point are increased in number, and a beam diameter becomes small and thus picks up noise caused by print irregularity, etc. This is because beam diameters are changed by a factor of two between the nearest image point and the farthest image point, so that a beam diameter of the object point is required to be equal to a beam diameter obtained at a time of the maximum imaging magnification. As a result, a beam diameter on an image point obtained at a time of the minimum imaging magnification is half a predetermined beam diameter, so that the focus depth becomes shallow. Although the shallow focus depth can be overcome by setting the shift amount steps for adjusting a focal point to be small increments, this results in an increase of the focal point adjusting steps.

Otherwise, a zoom lens in which an image point can be moved without changing the beam diameter at the image point is described on pages 270 to 272 in a journal "KOGAKU" of Hiroshi Kubota published by Iwanami Book Store. According to the zoom lens, however, there is a disadvantage in that three lenses are required to be moved, respectively, so that the structure of the system becomes complicated and expensive.

SUMMARY OF THE INVENTION

Accordingly, it is an object of the invention to provide a lens system for an optical reader in which a focal point can be moved without changing the beam diameter at the focal point.

It is an other object of the invention to provide a lens system for an optical reader which can be fabricated simply and at low cost.

According to the invention, a lens system for an optical reader includes:

first, second and third lenses having respective positive focal lengths, arranged in order to have a common optical axis, the first lens being moved along the common optical axis, and the second and third lenses providing a reverse telescope structure, whereby an image point formed by the third lens is moved along the common optical axis, and a constant spot diameter is realized at the image point;

wherein the first to third convex lenses meet equations defined below, $$f_1 = (\pi W_0 W_3 / \lambda) [z/(b_2 - b_1)]^{\frac{1}{2}}; \text{ and}$$

$$f_2 = f_3 [z/(b_2 - b_1)]^{\frac{1}{2}}$$

where $f_1$ is a focal length of the first lens, $f_2$ is a focal length of the second lens, $f_3$ is a focal length of the third lens, $W_0$ is a diameter of a beam incident to the first lens, $W_3$ is a diameter of a converged beam at the image point, $\lambda$ is a wave length of the beam, $z$ is a moving amount of the first lens, $b_1$ is a distance between the third lens and the image point formed at the nearest position from the third lens, and $b_2$ is a distance between the third lens and the image point formed at the farthest position from the third lens.

BRIEF DESCRIPTION OF THE DRAWINGS

The invention will be explained in more detail in conjunction with appended drawings; wherein:

FIGS. 1A and 1B are schematic structural illustrations showing a conventional lens system for a bar code reader;

FIGS. 3A and 3B are schematic structural illustrations showing a lens system for a bar code reader of a second preferred embodiment according to the invention.

DESCRIPTION OF THE PREFERRED EMBODIMENTS

Figures 2A, 2B:
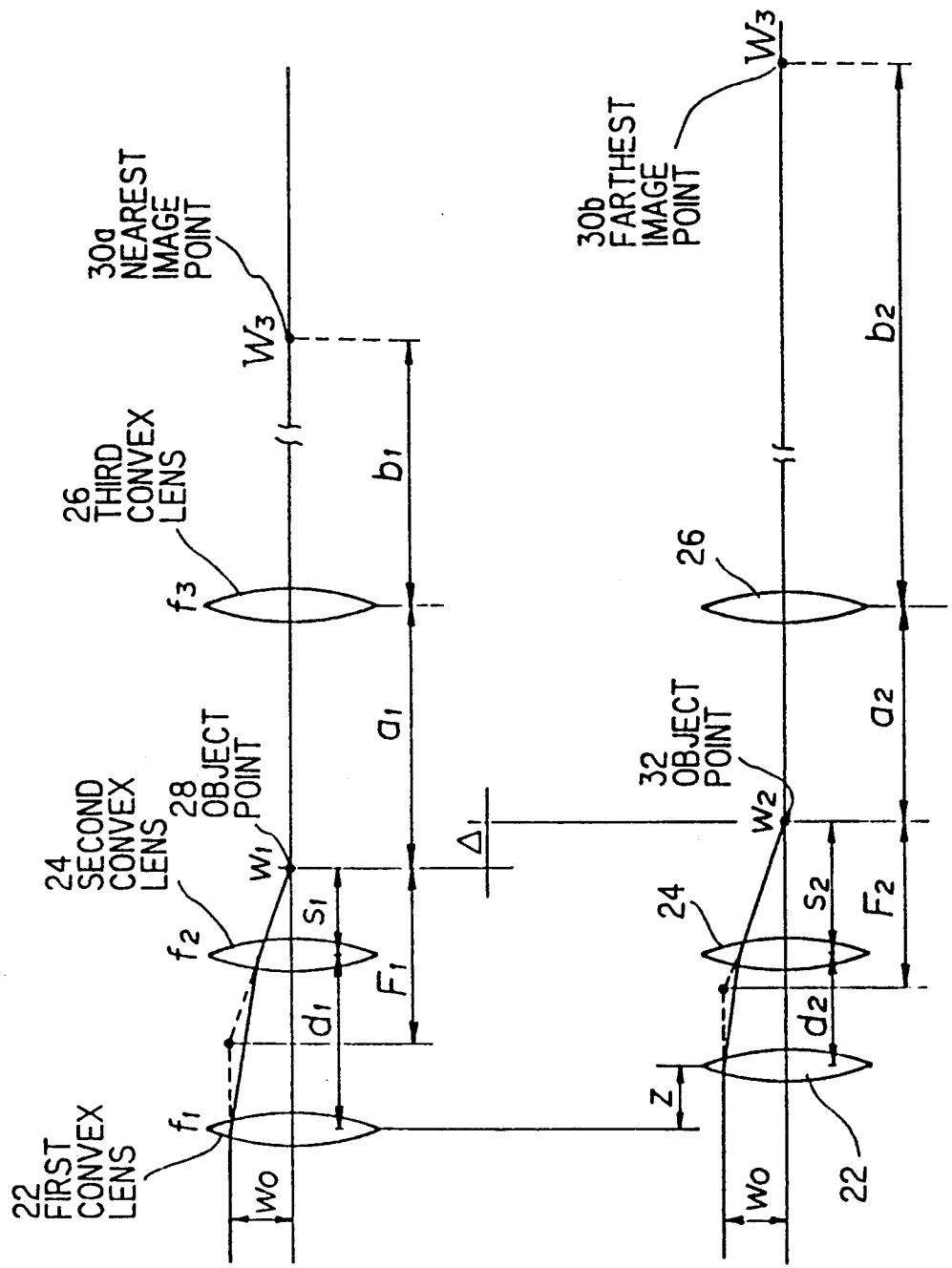
FIGS. 2A and 2B are schematic structural illustrations showing a lens system for a bar code reader of a first preferred embodiment according to the invention.

Before describing a lens system for a bar code reader according to the invention, the briefly aforementioned conventional lens system will be explained in conjunction with FIGS. 1A and 1B.

FIGS. 1A and 1B show the conventional lens system in the nearest focus mode and the farthest focus mode, respectively. The conventional lens system includes a lens 10 having a negative focal length and fixed on the side of an object point 12, and a lens 14 having a positive focal length, which is slidable along an optical axis on the side of an image point 16a (16b). The lens 10 and the lens 14 are positioned on the same optical axis with respect to each other. In these illustrations, "$a_1$" and "$a_2$" each indicates a distance between the object point 12 and the lens 14, "$b_1$" and "$b_2$" each indicates a distance between the lens 14 and the image point 16a (16b), and "$\Delta$" indicates a shift amount of the lens 14.

In the conventional lens system, the image point is moved when the lens 14 is slid in a direction of the optical axis. In this case, a stroke of the image point depends on the product of the stroke of the lens 14 and the longitudinal magnification, which is the square of the transversal magnification of the system. Therefore, when an imaging magnification (b/a) is large, the image point can be moved with a long stroke from the nearest point 16a to the farthest point 16b by a short sliding of the lens 14.

Concretely, when the lens 14 slides with the stroke of $\Delta$ (=1.97), the image point is moved 1000 mm as shown in the Table 1.

TABLE 1

| IMAGE POINT | DISTANCE a (mm) | DISTANCE b (mm) | IMAGING MAGNIFICATION b/a |
|---|---|---|---|
| NEAREST 16a | $a_1$ = 63.83 | $b_1$ = 1000 | 15.67 |
| FARTHEST 16b | $a_2$ = 61.86 | $b_2$ = 2000 | 32.33 |

As shown in the Table 1, the imaging magnification b/a is different by about twice between the nearest focus mode (FIG. 1A) and the farthest focus mode (FIG. 1B).

In the conventional lens system, when a beam diameter at the object point 12 is determined to be a suitable value for the farthest focus mode (FIG. 1B) to keep the beam at a predetermined diameter at the image point 16b, a beam diameter at the nearest image point 16a becomes half of that at the farthest image point 16b. As a result, a depth of focus at the nearest image point 16a becomes shallow, so that the bar code reader may detect noise on the bar code caused by print irregularity, etc.. In this situation, if the focal point adjustment is carried out with a short distance, the aforementioned disadvantage can be overcome. However, the number of steps is increased, so that operation of the lens system becomes complicated.

FIGS. 2A and 2B shows a lens system, in the nearest and the farthest focus modes, respectively, of a first preferred embodiment according to the invention. The lens system of the first preferred embodiment includes first, second and third lenses 22, 24 and 26 having respective positive focal lengths and positioned on the same optical axis, respectively. The first lens 22 is set up to be slidable along the optical axis with a stroke "z", the second and third lenses 24 and 26 are positioned with an object point 28 between to be fixed. The first, second and third lenses 22, 24 and 26 can be made of a combination of lenses.

The lens system is fabricated to meet the following equations (1) and (2), so that values for the beam diameter between the nearest image point 30a and the farthest image point 30b become equal. In the equations, symbols "$f_1$", "$f_2$" and "$f_3$" are the focal length of the first, second and third lenses 22, 24 and 26, respectively, "$b_1$" is a distance between the third lens 26 and the nearest image point 30a, "$b_2$" is a distance between the third lens 26 and the farthest image point 30b, "$W_0$" is a diameter of an incident collimated beam supplied to the first lens 22, "$W_3$" is a diameter of a converged beam at the image point 30a (30b), and "$\lambda$" is a wavelength of the laser beam, respectively.

$$f_1 = (\pi W_0 W_3/\lambda)[z/(b_2-b_1)]^{\frac{1}{2}} \quad (1)$$

$$f_2 = f_3[z/(b_2-b_1)]^{\frac{1}{2}} \quad (2)$$

Next, the theory of the first preferred embodiment will be explained in accordance with following equations (3) and (4).

A synthesis focal length "F" of the first and second lenses 22 and 24 is calculated by the following equation (3). In this equation (3), "d" is a distance between the first and second lenses 22 and 24.

$$1/F = 1/f_1 + 1/f_2 - d/(f_1 f_2) \quad (3)$$

In the lens system, there is a focal relation as defined in the following equation (4). In this equation (4), "S" is a distance between the second lens 24 and the object point 28.

$$1/S - 1/(f_1-d) = 1/f_2 \quad (4)$$

Then, when the above equations (3) and (4) are applied to the case of the first preferred embodiment, the following equations (5) to (8) can be obtained. In these equations (5) to (8), symbols suffixed "$_1$" indicate the case in the nearest focus mode shown in FIG. 2A and symbols suffixed "$_2$" indicate the case in the farthest focus mode shown in FIG. 2B.

$$1/F_1 = 1/f_1 + 1/f_2 - d_1/(f_1 f_2) \quad (5)$$

$$1/F_2 = 1/f_1 + 1/f_2 - d_2/(f_1 f_2) \quad (6)$$

$$1/S_1 - 1/(f_1-d_1) = 1/f_2 \quad (7)$$

$$1/S_2 - 1/(f_1-d_2) = 1/f_2 \quad (8)$$

The following equations (9) and (10) can be obtained by using the synthesis focal lengths $F_1$ and $F_2$ and beam diameters $W_1$ and $W_2$ at the object points 28 and 32.

$$F_1 \lambda/(\pi W_1) = W_0 \quad (9)$$

$$F_2 \lambda/(\pi W_2) = W_0 \quad (10)$$

The synthesis focal lengths $F_1$ and $F_2$ are calculated by the following equations (11) and (12).

$$F_1 = \pi W_0 W_1/\lambda \quad (11)$$

$$F_2 = \pi W_0 W_2/\lambda \quad (12)$$

A distance $\Delta$ between the object points 28 and 32 and the stroke "z" of the first lens 22 are calculated by the following equations (13) and (14), respectively.

$$S_2 - S_1 = \Delta \quad (13)$$

$$d_1 - d_2 = z \quad (14)$$

Next, each of six unknown parameters $f_1$, $f_2$, $d_1$, $d_2$, $S_1$ and $S_2$ will be calculated from the equations (5), (6), (7), (8), (13) and (14). In this calculation, the ratio of the beam diameters $W_1$ and $W_2$ is determined to be "k" by the following equation (15).

$$k = W_2/W_1 = F_2/F_1 \quad (15)$$

First, the synthesis focal length $F_1$ and $F_2$ are eliminated by using the equations (5), (6) and (15), and the distances $S_1$ and $S_2$ are eliminated by using the equations (7), (8) and (13), so that the distances $d_1$ and $d_2$ are calculated.

That is, the distance $d_1$ can be calculated by the following equation (16).

$$d_1 = (f_1 + f_2) - k(f_1 + f_2 - d_2) \tag{16}$$

When the distances $S_1$ and $S_2$ are eliminated by using the equations (7), (8) and (13), the following equation (17) can be obtained.

$$f_2(f_1-d_2)/(f_1+f_2-d_2) - f_2(f_1-d_1)/(f_1+f_2-d_1) = \Delta \tag{17}$$

The distances $d_1$ and $d_2$ are calculated by the following equations (18) and (19) by using the equations (16) and (17).

$$d_1 = (f_1+f_2) - (1-k)f_2^2/\Delta \tag{18}$$

$$d_2 = (f_1+f_2) - (1-k)f_2^2/\Delta k \tag{19}$$

The focal length $f_2$ is calculated by the following equation (20) by using the equations (12), (18) and (19). In this equation (20), the focal length $f_2$ of negative value indicates one for a lens having a negative focal length.

$$f_2 = \pm [\Delta k z]^{\frac{1}{2}}/(1-k) \tag{20}$$

The focal length $f_1$ is calculated by the following equation (21) by using the equations (5), (6) and (14).

$$f_1 = F_2 z/[f_2(1-k)] \tag{21}$$

The distance $d_1$ and $d_2$ can be calculated by substituting the focal length $f_1$ and $f_2$ for the equations (18) and (19), so that the distance $S_1$ and $S_2$ are calculated by the following equations (22) and (23) by using the equations (7) and (8), respectively.

$$S_1 = f_2(f_1-d_1)/(f_1+f_2-d_1) \tag{22}$$

$$S_2 = f_2(f_1-d_2)/(f_1+f_2-d_2) \tag{23}$$

According to the equations (18) to (23), the lens system of the first preferred embodiment can be designed.

Next, relations among $f_1$, $f_2$, $d_1$, $d_2$, $S_1$ and $S_2$ will be explained in conjunction with following equations (24) to (39).

In this embodiment, two values of beam diameter on the image points are determined as the same value between the nearest focus mode and the farthest focus mode. Therefore, the lens system is required to meet the following equation (24).

$$W_1 b_1/a_1 = W_2 b_2/a_2$$

$$(W_1 b_1/a_1 = W_3, \ W_2 b_2/a_2 = W_3) \tag{24}$$

When the equation (24) is substituted for the equation (15), the following equation (25) is obtained.

$$k = a_2 b_1/(a_1 b_2) \tag{25}$$

The distances $a_1$ and $a_2$ can be indicated by the following equations (26) and (27) in accordance with the focal relation of the third lens 26.

$$a_1 = b_1 f_3/(b_1 - f_3) \tag{26}$$

$$a_2 = b_2 f_3/(b_2 - f_3) \tag{27}$$

When the equations (26) and (27) are substituted for the equation (25), the following equations (28) and (29) are obtained.

$$k = (b_1 - f_3)/(b_2 - f_3) \tag{28}$$

$$1 - k = (b_2 - b_1)/(b_2 - f_3) \tag{29}$$

The distances $a_1$ and $a_2$ can be calculated by the following equation (30) in accordance with FIGS. 2A and 2B.

$$\Delta = a_1 - a_2 \tag{30}$$

When the equations (26) and (27) are substituted for the equation (30), the following equation (31) is obtained.

$$\Delta = f_3^2(b_2-b_1)/[(b_1-f_3)(b_2-f_3)] \tag{31}$$

When the equations (28), (29) and (31) are substituted for the equation (20), the following equation (32) is obtained.

$$f_2 = f_3 [z/(b_2-b_1)]^{\frac{1}{2}} \tag{32}$$

The equation (32) indicates that the focal length $f_2$ is proportional to the focal length $f_3$.

Next, the focal length $f_1$ of the first lens 22 will be calculated. The beam diameter $W_2$ at the object point 32 in the farthest focus mode is calculated by the following equation (33).

$$W_2 = W_3 a_2/b_2 \tag{33}$$

When the equation (33) is substituted for the equation (12), the following equation (34) is obtained.

$$F_2 = \pi W_0 W_3 a_2/(\lambda b_2) \tag{34}$$

When the equations (29), (32) and (34) are substituted for the equation (21), the focal length $f_1$ is calculated by following equation (35).

$$f_1 = (\pi W_0 W_3/\lambda) [z/(b_2-b_1)]^{\frac{1}{2}} \tag{35}$$

The equation (35) indicates that the focal length $f_1$ of the first lens 22 does not depend on the focal length $f_2$ and $f_3$ of the second and third lenses 24 and 26, and is proportional to the diameter $W_0$ of the incident collimated beam and to the beam diameter $W_3$ at the image point.

When the equation (23) is substituted for the equation (35), a relation among the focal lengths of the first, second and third lenses 22, 24 and 26 can be obtained by the following equations (36) and (37).

$$(f_1/W_0)/(f_2/f_3) = \pi W_3/\lambda \tag{36}$$

$$f_1 f_3/f_2 = \pi W_0 W_3/\lambda \tag{37}$$

Next, a relation of positions between the second and third lenses 24 and 26 will be studied. When the equations (22) and (24) are substituted for the equation "$S_1 + a_1$", the distance between the second and third lenses 24 and 26 can be obtained by the following equation (38).

$$S_1 + a_1 = f_2(f_1-d_1)/(f_1+f_2-d_1) + b_1 f_3/(b_1-f_3) \tag{38}$$

The following equation (39) can be obtained in accordance with the equations (18), (29) and (31).

The equation (39) indicates that a telescope structure (a reverse telescope structure) is composed of the second lens 24 and the third lens 26.

$$S_1 + a_1 = f_2 + f_3 \quad (39)$$

Next, a concrete case will be explained in accordance with the aforementioned theory. According to the first preferred embodiment, it is necessary that the lens system meets one of the following conditions (40) and (41) in order that the beam diameter $W_3$ at the nearest and farthest image points 30a and 30b be equal.

$$\Delta > 0, k < 1 \quad (40)$$

$$\Delta < 0, k > 1 \quad (41)$$

According to the Table 1 shown for the conventional lens system, the distance "$\Delta$" and the ratio "k" are calculated by following equations ① or ② by using the equation (24), respectively. The equations ① and ② indicate the same meaning.

$$\Delta = 1.92 \text{ mm}, k = 0.4846 \ (\Delta > 0, k < 1) \quad (1)$$

$$\Delta = -1.92 \text{ mm}, k = 2.063 \ (\Delta < 0, k > 1) \quad (2)$$

For instance, when the beam diameter $W_3$ at the image point is 100 μm, the beam diameter $W_1$ is calculated to be 6.382 μm and the beam diameter $W_2$ is calculated to be 3.093 μm on condition of the Table 1. In addition, when the wavelength "$\lambda = 0.67$ μm" and the incident beam diameter "$W_0 = 1$ mm", the synthesis focal length $F_2$ is calculated as 14.503 mm. Further, when the distance $z = 5$ mm, the focal length $f_1$ and $f_2$, the distance $d_1$, $d_2$, $S_1$ and $S_2$ are calculated as follows, respectively.

$$f_1 = 33.62 \text{ mm}, f_2 = 4.185 \text{ mm}$$

$$d_1 = 33.10 \text{ mm}, d_2 = 28.10 \text{ mm}$$

$$S_1 = 0.4594 \text{ mm}, S_2 = 2.380 \text{ mm}$$

As explained above, when the first lens 22 is moved by 5 mm, the object point is moved from $W_1$ to $W_2$ by 1.92 mm ($S_1 - S_2$). When a distance between the second lens 24 and the third lens 26 meet to the equation "$S_1 + a_1 = S_2 + a_2 = 64.2$ mm", the same imaging magnification (b/a) as in Table 1 is obtained.

A Table 2 shows the change of the focal points "a" and "b" and diameter "$W_3$" at the image point in relation to a position of the first lens 22.

TABLE 2

| DISTANCE d (mm) | a (mm) | b (mm) | DIAMETER OF BEAM $W_3$ (μm) |
|---|---|---|---|
| 33 | 63.70 | 1032.8 | 101.3 |
| 32 | 63.07 | 1231.7 | 101.0 |
| 31 | 62.63 | 1429.3 | 100.7 |
| 30 | 62.30 | 1625.8 | 100.3 |
| 29 | 62.04 | 1821.2 | 100.0 |
| 28 | 61.84 | 2015.7 | 99.7 |

In this embodiment, if the focal lengths of the first, second and third lenses 22, 24 and 26 are determined to be $f_1 = 33.16$ mm, $f_2 = 7.07$ mm and $f_3 = 100$ mm, respectively, the focal length of the second lens 24 becomes longer than the above case.

FIGS. 3A and 3B show a lens system in the nearest and farthest focus modes, respectively, of a second preferred embodiment according to the invention. The lens system includes first and second lenses 40 and 42 having respective negative focal lengths and a lens 44 having a positive focal length. In the second preferred embodiment, the first lens 40 corresponds to the second lens 24 of the first preferred embodiment, the second lens 42 corresponds to the first lens 22 of the first preferred embodiment and the lens 44 corresponds to the third lens 26 of the first preferred embodiment, respectively.

In more detail, in the equation (20), when a sign of the symbol "$f_2$" is negative, a sign of the symbol "$f_1$" also becomes negative from the equation (21) and a sign of the symbol "$f_3$" becomes positive from the equation (32). As the result, signs of the distances "d1" and "d2" become negative, that is, the first lens and the second lens are positioned on the opposite sides each other in relation to a case of the first preferred embodiment. Therefore, the theory of the first preferred embodiment can be used for the second preferred embodiment. According to the second preferred embodiment, the lens system can be fabricated to be shorter than that of the first preferred embodiment.

As described above, according to the first and second preferred embodiments, the diameter of the laser beam at the image point can be fixed to be a suitable value by rendering the diameter at the image point to be equal between the nearest and farthest focus modes.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A lens system for an optical reader, comprising:
   first, second and third lenses having respective positive focal lengths and arranged in order to have a common optical axis, said first lens being movable along said common optical axis, and said second and third lenses providing a reverse telescope structure, whereby an image point formed by said third lens is movable along said common optical axis, and a substantially constant spot diameter is realized at said image point;
   wherein said first to third lenses meet equations defined below, $$f_1 = (\pi W_0 W_3 / \lambda) [z/(b_2 - b_1)]^{\frac{1}{2}}; \text{ and}$$

$$f_2 = f_3 [z/(b_2 - b_1)]^{\frac{1}{2}}$$

where $f_1$ is a focal length of said first lens, $f_2$ is focal length of said second lens, $f_3$ is a focal length of said third lens, $W_0$ is a diameter of a beam incident to said first lens, $W_3$ is a diameter of a converged beam at said image point, $\lambda$ is a wave length of said beam, z is a displacement distance of said first lens, $b_1$ is a distance between said third lens and said image point formed at the nearest position from said third lens, and $b_2$ is a distance between said third lens and said image point formed at the farthest position from said third lens.

2. A lens system for an optical reader, comprising:

first and second lenses having respective negative focal lengths and a third lens having a positive focal length, arranged in order to have a common optical axis, said second lens being movable along said common optical axis, and said first lens and said third lens providing a reverse telescope structure, whereby an image point formed by said third lens is movable along said common optical axis, and a substantially constant spot diameter is realized at said image point;

wherein said first and second lenses and said third lens meet equations defined below, $$f_1 = (\pi W_0 W_3/\lambda) [z/(b_2-b_1)]^{\frac{1}{2}}; \text{ and}$$

$$f_2 = f_3 [z/(b_2-b_1)]^{\frac{1}{2}}$$

where $f_1$ is a focal length of said second lens, $f_2$ is a focal length of said first lens, $f_3$ is a focal length of said third lens, $W_0$ is a diameter of a beam incident to said first lens, $W_3$ is a diameter of a converged beam at said image point, $\lambda$ is a wave length of said beam, $z$ is a displacement distance of said second lens, $b_1$ is a distance between said third lens and said image point formed at the nearest position from said third lens, and $b_2$ is a distance between said third lens and said image point formed at the farthest position from said third lens.

3. A lens system for an optical reader, comprising:

first, second and third lenses arranged in order to have a common optical axis, said first lens being movable along said common optical axis to shift an object point, and said third lens forming an image point in accordance with said object point, whereby said image point is movable along said common optical axis, and a substantially constant spot diameter is realized at said image point; wherein said first to third lenses each have a positive focal length.

4. A lens system for an optical reader, comprising:

first, second and third lenses arranged in order to have a common optical axis, said second lens being movable along said common optical axis to shift an object point, and said third lens forming an image point in accordance with said object point, whereby said image point is movable along said common optical axis, and a substantially constant spot diameter is realized at said image point; wherein said first and second lenses have a negative focal length and said third lens has a positive focal length.

* * * * *

UNITED STATES PATENT AND TRADEMARK OFFICE
CERTIFICATE OF CORRECTION

PATENT NO. : 5,267,083

DATED : November 30, 1993

INVENTOR(S) : Yuzo Ono, et al.

It is certified that error appears in the above-identified patent and that said Letters Patent is hereby corrected as shown below:

Col. 1, line 54, delete "of" and insert --in--; after "the" insert --number of--;

Col. 2, line 14, delete "convex".

Signed and Sealed this

Nineteenth Day of July, 1994

Attest:

BRUCE LEHMAN

Attesting Officer     Commissioner of Patents and Trademarks